July 14, 1959 R. HINTZE 2,894,678
VIBRATION REDUCING SUPPORTING ARRANGEMENT
Filed July 19, 1955 2 Sheets-Sheet 2

INVENTOR
Rudolf Hintze
BY Michael S. Striker
ATTORNEY

United States Patent Office 2,894,678
Patented July 14, 1959

2,894,678

VIBRATION REDUCING SUPPORTING ARRANGEMENT

Rudolf Hintze, Neuenhain, uber Bad Soden (Taunus), Germany, assignor to Stempel-Hermetik G.m.b.H., Frankfurt am Main, Germany Application July 19, 1955, Serial No. 523,074

Claims priority, application Germany July 21, 1954

7 Claims. (Cl. 230—58)

The present invention relates to vibration reducing supporting arrangements, and more particularly to a vibration reducing supporting arrangement for a refrigerator compressor which is enclosed in a hermetically sealed casing.

It is known to arrange small refrigerator compressors in hermetically sealed casings in order to obtain a quiet operation as is desired for use in the home. The compressor is resiliently mounted in the casing so that the vibrations and noises produced by the compressor are absorbed. Suppression of noise and vibrations is particularly important in small refrigerating units since for economical reasons frequently one cylinder compressors are used which do not permit a complete balancing.

In enclosed compressors of this type, the electric current for the drive motor is supplied through flexible conductors, and the compressed gas passes through a loop-shaped outlet pipe which extends between the resiliently supported motor-compressor unit and the casing. The resilient supports according to the known art absorb vertical vibrations of the motor-compressor unit fairly well, but are only little effective as regards transverse oscillations which act on the supporting springs in horizontal direction.

It is one object of the present invention to overcome the disadvantages of the resilient compressor supports according to the known art, and to provide a vibration reducing supporting arrangement for an enclosed compressor unit capable of absorbing a maximum of vibrations and noise.

It is another object of the present invention to provide resilient support for an enclosed compressor unit which absorbs not only vibrations in axial direction of the compressor motor but also vibrations in a transverse direction.

It is a further object of the present invention to provide a resilient support for an enclosed compressor unit capable of absorbing shocks and vibrations occurring in circumferential direction when the motor is started or stopped.

It is another object of the present invention to provide a resilient supporting arrangement for an enclosed compressor unit which permits mounting of the compressor unit in the sealed casing in a simple and fast operation.

A further object of the present invention is the provision of a resilient support for an enclosed compressor unit permitting transverse oscillations but limiting such oscillations by abutment means which prevent an undesired engagement between easily damaged parts of the resiliently supported compressor unit and the supporting casing.

With these objects in view, the present invention mainly consists in a vibration reducing supporting arrangement for a compressor unit and comprises a compressor unit including two supporting end members; a closed casing enveloping the compressor unit and including two opposite end walls, each of the end walls being located opposite one of the end members; and a pair of resilient means respectively located between one of the end members and the opposite end wall associated with the same. The resilient means support the compressor unit in the casing and exert opposite forces on the compressor unit so that the vibrations produced by the operating compressor unit are absorbed by the resilient means and not transferred to the casing.

According to a preferred embodiment of the present invention the resilient means are cylindrical or frusto-conical coil springs which are arranged in the axis of rotation of the motor-compressor unit.

Preferably, the ends of the coil springs are fixedly secured to the end walls and end members, respectively, so that shocks caused by the starting and stopping of the motor-compressor unit are also absorbed.

In a preferred embodiment of the present invention, the coil springs are located in frusto-conical recesses formed in the supporting end members of the compressor unit, while frusto-conical projections of the end walls project into the coil springs. The associated projections and recesses permit limited transverse oscillations of the motor-compressor unit in the casing, but engage each other when the relative transverse movement exceeds the predetermined extent so that contact between easily damaged portions of the motor-compressor unit and the casing is prevented even if the casing is exposed to severe shocks.

In the event that the axis of rotation of the motor-compressor unit is vertical, the lower coil spring counterbalances the resilient force exerted by the upper coil spring, and in addition thereto supports the weight of the motor-compressor unit. In this arrangement, it is necessary to provide a stronger lower coil spring capable of supporting the weight of the motor-compressor unit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing in which:

Figure 1:
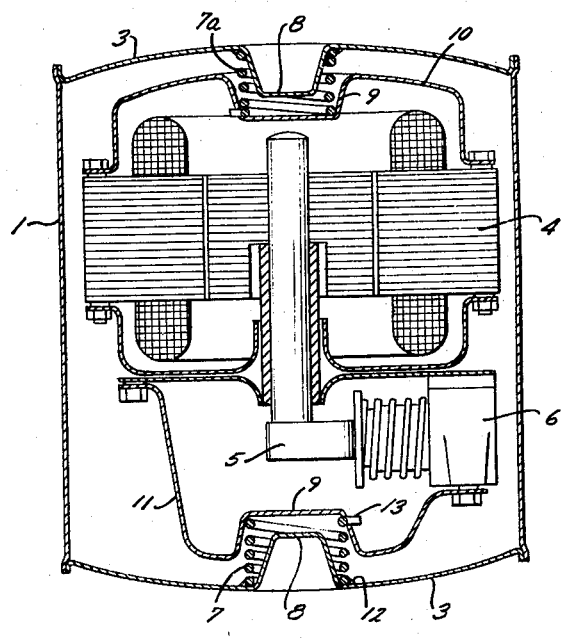
Fig. 1 shows a longitudinal sectional view of a preferred embodiment of the present invention.

Referring now to the drawing, the casing which hermetically encloses the motor-compressor unit consists of a tubular part 1 and of two end walls 3. The motor-compressor unit is arranged in the casing 1, 3 and comprises an electric motor 4, a shaft 5 provided with an operating cam, and the compressor 6 which is reciprocated by the cam shaft 5.

In accordance with the present invention, the motor-compressor unit is resiliently supported in the casing by two prestressed coil springs 7 and 7a. The coil springs 7, 7a are arranged in such manner that their common axis substantially coincides with the axis of shaft 5. In the embodiments illustrated by Figs. 1 and 3 the coil springs are cylindrical, but in the example shown by Fig. 2 the apparatus is provided with frusto-conical coil springs, 7' and 7'a other suitable resilient means being also suitable if they perform analogously.

Figure 2:
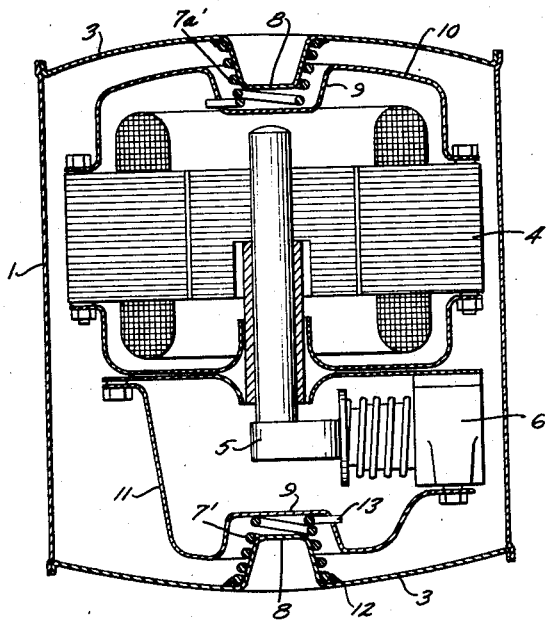
Fig. 2 is a similar view of a modified embodiment.
Figure 3:
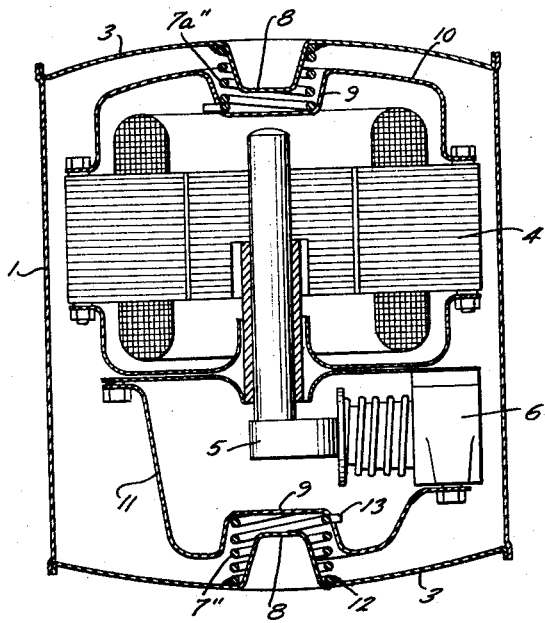
Fig. 3 is another similar view of a second modification of the embodiment of Fig. 1.

The coil springs 7, 7a or 7', 7'a and 7", 7"a, respectively, as shown in Figs. 2 and 3 are mounted in depressed abutment portions 9 provided in the transverse supporting end members 10 and 11 of the motor-compressor unit. Herebelow, all references to the coil springs 7, 7a (Fig. 1) generally apply likewise to the springs 7', 7'a and 7", 7"a, respectively, of Figs. 2 and 3. Corresponding abutment portions of the end walls 3 are provided with frusto-conical projections 8, which partly project into the associated oppositely located depressed abutment portions 9, so that relative transverse movement between the motor-compressor unit and the casing is terminated when the projections 8 progressively urge the springs 7, 7a against the walls of the conical depressed portions 9. Thereby engagement between the motor 4 and the tubular wall 1 is prevented, even if the casing is exposed to severe transverse shocks as may occur during shipping.

Limited transverse oscillations, however, are reliably absorbed by the coil springs 7 and 7a. Longitudinal vibrations in the direction of the axis of shaft 5 are also absorbed by the coil springs 7 and 7a, particularly since the same are prestressed, and preferably resiliently compressed when the compressor unit is mounted in the casing.

While in the embodiment illustrated in the drawing, the projections 8 are provided in the casing, and the depressed portions 9 are provided in the transverse end members of the motor-compressor unit, it will be understood that the projections can be provided on the end members 10 of the motor-compressor unit and the depressed portions formed in the end walls 3 of the casing.

Since shaft 5 is vertical, the motor-compressor unit is supported on the lower spring 7, which is stronger than the spring 7a so that it compensates the resilient force exerted by the compressed spring 7a, and in addition thereto carries the weight of the motor-compressor unit.

The coil springs 7 and 7a (Fig. 1), 7' and 7'a (Fig. 2) and 7" and 7"a (Fig. 3) are wound and prestressed so as to exert opposite torques, but in the device shown by Fig. 2 the springs 7', 7'a are wound in opposite directions, while the springs 7, 7a and 7", 7"a, respectively shown in Figs. 1 and 3 are wound in the same direction. In all these embodiments the springs are secured at their respective ends to the end walls 3 and to the end members 10. In the illustrated embodiments, the outer ends of the coil springs are soldered to the end walls 3 as designated by reference numeral 12, whereas the inner ends of the coil springs are bent to form small hooks 13 projecting into corresponding holes in the depressed abutment portions. Consequently, angular displacement of the end members 10, and of the entire compressor unit, relative to the casing 1, 3 is opposed by the resilient action of the coil springs 7 and 7a. Due to this arrangement, sudden shocks in the direction of rotation which occur when the motor 4 is started or stopped, are absorbed by the coil springs 7 and 7a.

It will be understood that the coil springs 7 and 7a may be attached to the members 9 and 3 in a different manner. For instance, the inner ends of the springs can be bent inwardly to engage a recess between projections on the bottom of the depressed portion 9.

From the above description of preferred embodiments of the present invention it will be apparent that the vibration reducing supporting arrangement according to the present invention is capable of absorbing oscillations occurring in axial, transverse, and circumferential directions so that a minimum of noise and vibrations is transferred to the hermetically sealed casing 1, 3. It will be also appreciated, that the arrangement of the present invention permits a very fast assembly of the apparatus by unskilled workers, since it is only necessary to insert the coil springs and the motor-compressor unit and then close the casing by attaching the end cover walls 3. The coil springs 7 and 7a are so dimensioned that they are prestressed when the covers 3 are secured to the tubular wall 1 of the casing.

It will be understood that each of the elements described above, or two or more together, may also find a useful application in other types of vibration reducing supporting arrangements differing from the types described above.

While the invention has been illustrated and described as embodied in a vibration reducing supporting arrangement for a refrigerator motor-compressor unit which is arranged in a hermetically sealed casing, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Vibration reducing supporting arrangement for a compressor unit comprising, in combination, a motor-compressor unit including a rotary shaft and two supporting transverse end members having first abutment portions located opposite the ends of said shaft; a closed casing enveloping said motor-compressor unit and including two opposite end walls extending transverse to said shaft, each of said end walls having a second abutment portion located opposite and spaced from one of said first abutment portions so that pairs of first and second abutment portions are located opposite each other, one abutment portion of each pair of first and second abutment portions being a depressed portion, and the other abutment portion of each pair of abutment portions including a projecting portion projecting into the respective associated depressed abutment portion spaced from the same; and a pair of prestressed resilient coil spring means, each of said coil spring means abutting at one end thereof against one of said depressed abutment portions and surrounding at the other end thereof the projecting portion of the associated abutment portion, abutting against the latter, said coil spring means being fixedly secured with their respective ends to the abutment portions, respectively, against which they abut, and exerting opposite axial forces and opposite torques on said motor-compressor unit.

2. An arrangement as set forth in claim 1 wherein said coil spring means are cylindrical.

3. An arrangement as set forth in claim 1 wherein said coil spring means are frusto-conical.

4. Vibration reducing supporting arrangement for a compressor unit comprising, in combination, a motor-compressor unit including a rotary shaft and two supporting transverse end members having first abutment portions located opposite the ends of said shaft; a closed casing enveloping said motor-compressor unit and including two opposite end walls extending transverse to said shaft, each of said end walls having a second abutment portion located opposite and spaced from one of said first abutment portions so that pairs of first and second abutment portions are located opposite each other, one abutment portion of each pair of first and second abutment portions being a depressed portion, and the other abutment portion of each pair of abutment portions including a projecting portion projecting into the respective associated depressed abutment portion spaced from the same; and a pair of prestressed resilient coil spring means, each of said coil spring means abutting at one end thereof against one of said depressed abutment portions and surrounding at the other end thereof the associated projecting portion, each of said coil spring means having the ends thereof fixedly secured to the abutment portions of a pair of first and second abutment portions, respectively, said coil spring means exerting opposite axial forces and opposite torques on said motor-compressor unit.

5. An arrangement as claimed in claim 4 wherein said projecting abutment portions are spaced from the respective associated depressed abutment portion for a predetermined distance for limited relative transverse movement between said motor-compressor unit and said casing.

6. Vibration reducing supporting arrangement for a compressor unit comprising, in combination, a motor-compressor unit including a vertical shaft and having two supporting end members formed with depressed opposite frusto-conical abutment portions located opposite the ends of said vertical shaft; a closed casing enveloping said motor-compressor unit and including two opposite end walls, each of said end walls having an inwardly projecting frusto-conical abutment portion projecting into one of said depressed abutment portions and being spaced from the same for a predetermined distance in transverse direction for limiting transverse movement of said motor-compressor unit relative to said casing; and a pair of resilient prestressed coil spring means, each of said coil spring means being partly located in and abutting at one end thereof against one of said depressed abutment portions and surrounding at the other end thereof the respective associated projecting abutment portion, each of said coil spring means having the ends thereof fixedly secured to associated depressed and projecting abutment portions, respectively, said coil spring means exerting opposite axial forces and opposite torques on said motor-compressor unit, one of said coil springs being located opposite the lower end of said vertical shaft and being stronger than the other of said coil springs to compensate for the weight of said motor-compressor unit.

7. Vibration reducing supporting arrangement for a refrigerator compressor unit comprising, in combination, a motor-compressor unit including a vertical shaft and having two supporting end members formed with depressed opposite frusto-conical abutment portions located opposite the ends of said vertical shaft; a hermetically sealed closed casing enveloping said motor-compressor unit and including two opposite end walls, each of said end walls having an inwardly projecting frusto-conical abutment portion projecting into one of said depressed abutment portions and being spaced from the same for a predetermined distance in transverse direction for limiting transverse movement of said motor-compressor unit relative to said casing; and a pair of resilient prestressed coil spring means, each of said coil spring means being partly located in and abutting at one end thereof against one of said depressed abutment portions and surrounding at the other end thereof the respective associated projecting abutment portion, each of said coil spring means having the ends thereof fixedly secured to associated depressed and projecting abutment portions, respectively, said coil spring means being wound in opposite directions and exerting opposite axial forces and opposite torques on said motor-compressor unit, one of said coil springs being located opposite the lower end of said vertical shaft and being stronger than the other of said coil springs to compensate for the weight of said motor-compressor unit.

References Cited in the file of this patent

UNITED STATES PATENTS

| | | |
|---|---|---|
| 1,021,310 | Hawthorne et al. | Mar. 26, 1912 |
| 1,860,884 | Bilde | May 31, 1932 |
| 2,040,507 | Terry | May 12, 1936 |
| 2,089,601 | Faber | Aug. 10, 1937 |
| 2,233,082 | Kucher | Feb. 25, 1941 |
| 2,463,035 | Heitchue | Mar. 1, 1949 |
| 2,717,748 | Martinet | Sept. 13, 1955 |

FOREIGN PATENTS

| | | |
|---|---|---|
| 690,305 | France | June 16, 1930 |